(12) United States Patent
Wu et al.

(10) Patent No.: US 7,660,460 B2
(45) Date of Patent: Feb. 9, 2010

(54) GAMUT SELECTION IN MULTI-ENGINE SYSTEMS

(75) Inventors: Wencheng Wu, Webster, NY (US); Edul N. Dalal, Webster, NY (US); Zhigang Fan, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 708 days.

(21) Appl. No.: 11/274,638

(22) Filed: Nov. 15, 2005

(65) Prior Publication Data

US 2007/0110301 A1    May 17, 2007

(51) Int. Cl.
G06K 9/00 (2006.01)
G06K 9/34 (2006.01)

(52) U.S. Cl. .................. 382/162; 382/180; 382/175; 382/164; 382/165; 382/170

(58) Field of Classification Search .................. 382/162, 382/180, 175, 164, 165, 170
See application file for complete search history.

(56) References Cited

U.S. PATENT DOCUMENTS

| | | | |
|---|---|---|---|
| 4,579,446 A | 4/1986 | Fujino et al. | |
| 4,587,532 A | 5/1986 | Asano | |
| 4,836,119 A | 6/1989 | Siraco et al. | |
| 5,004,222 A | 4/1991 | Dobashi | |
| 5,080,340 A | 1/1992 | Hacknauer et al. | |
| 5,095,342 A | 3/1992 | Farrell et al. | |
| 5,159,395 A | 10/1992 | Farrell et al. | |
| 5,208,640 A | 5/1993 | Horie et al. | |
| 5,272,511 A | 12/1993 | Conrad et al. | |
| 5,326,093 A | 7/1994 | Sollitt | |
| 5,435,544 A | 7/1995 | Mandel | |
| 5,473,419 A | 12/1995 | Russel et al. | |
| 5,489,969 A | 2/1996 | Soler et al. | |
| 5,504,568 A | 4/1996 | Saraswat et al. | |
| 5,525,031 A | 6/1996 | Fox | |
| 5,546,474 A * | 8/1996 | Zuniga | ................. 382/176 |
| 5,557,367 A | 9/1996 | Yang et al. | |
| 5,568,246 A | 10/1996 | Keller et al. | |
| 5,570,172 A | 10/1996 | Acquaviva | |

(Continued)

OTHER PUBLICATIONS

Prabhakar, et al., "Picture-Graphics Color Image Classification," IEEE ICIP 2002, pp. 785-788.

(Continued)

*Primary Examiner*—Bhavesh M Mehta
*Assistant Examiner*—Bernard Krasnic
(74) *Attorney, Agent, or Firm*—Fay Sharpe LLP (57) ABSTRACT

In preparation for rendering respective portions of a document via a respective plurality of engines, objects within the document are identified and characterized. A determination is made as to whether gamut variations between the engines might result in objectionable variations in the appearance of rendered versions of identified objects having similar characteristics. For those objects within the document for which the determination is made that variations might be objectionable, a target gamut is selected to be an intersection gamut of the engines to be used to render the document. For those objects within the document for which the determination is made that variations would be unobjectionable, the target gamut is selected to be that of selected individual engines. A system for selecting target gamuts for objects within a document can include an object identifier, a characteristic identifier and a gamut selector.

22 Claims, 6 Drawing Sheets

U.S. PATENT DOCUMENTS

| | | | | |
|---|---|---|---|---|
| 5,579,446 | A | * | 11/1996 | Naik et al. ............ 358/1.9 |
| 5,596,416 | A | | 1/1997 | Barry et al. |
| 5,629,762 | A | | 5/1997 | Mahoney et al. |
| 5,704,021 | A | * | 12/1997 | Smith et al. ............ 358/1.9 |
| 5,710,968 | A | | 1/1998 | Clark et al. |
| 5,778,377 | A | | 7/1998 | Marlin et al. |
| 5,884,910 | A | | 3/1999 | Mandel |
| 5,995,721 | A | | 11/1999 | Rourke et al. |
| 6,015,207 | A | * | 1/2000 | Winter et al. ............ 347/43 |
| 6,059,284 | A | | 5/2000 | Wolf et al. |
| 6,125,248 | A | | 9/2000 | Moser |
| 6,204,939 | B1 | * | 3/2001 | Lin et al. ............ 358/518 |
| 6,226,011 | B1 | * | 5/2001 | Sakuyama et al. ........ 345/600 |
| 6,241,242 | B1 | | 6/2001 | Munro |
| 6,297,886 | B1 | | 10/2001 | Cornell |
| 6,341,773 | B1 | | 1/2002 | Aprato et al. |
| 6,384,918 | B1 | | 5/2002 | Hubble, III et al. |
| 6,450,711 | B1 | | 9/2002 | Conrow |
| 6,476,376 | B1 | | 11/2002 | Biegelsen et al. |
| 6,476,923 | B1 | | 11/2002 | Cornell |
| 6,493,098 | B1 | | 12/2002 | Cornell |
| 6,537,910 | B1 | | 3/2003 | Burke et al. |
| 6,550,762 | B2 | | 4/2003 | Stoll |
| 6,554,276 | B2 | | 4/2003 | Jackson et al. |
| 6,577,925 | B1 | | 6/2003 | Fromherz |
| 6,607,320 | B2 | | 8/2003 | Bobrow et al. |
| 6,608,988 | B2 | | 8/2003 | Conrow |
| 6,612,566 | B2 | | 9/2003 | Stoll |
| 6,612,571 | B2 | | 9/2003 | Rider |
| 6,621,576 | B2 | | 9/2003 | Tandon et al. |
| 6,633,382 | B2 | | 10/2003 | Hubble, III et al. |
| 6,639,669 | B2 | | 10/2003 | Hubble, III et al. |
| 6,751,346 | B2 | * | 6/2004 | Shimizu ............ 382/162 |
| 6,798,530 | B1 | * | 9/2004 | Buckley et al. ............ 358/1.13 |
| 6,819,906 | B1 | | 11/2004 | Herrmann et al. |
| 6,925,283 | B1 | | 8/2005 | Mandel et al. |
| 6,959,165 | B2 | | 10/2005 | Mandel et al. |
| 7,106,474 | B1 | * | 9/2006 | Haikin et al. ............ 358/1.9 |
| 2002/0078012 | A1 | | 6/2002 | Ryan et al. |
| 2002/0103559 | A1 | | 8/2002 | Gartstein |
| 2003/0053683 | A1 | * | 3/2003 | Newman et al. ............ 382/162 |
| 2003/0077095 | A1 | | 4/2003 | Conrow |
| 2003/0128874 | A1 | * | 7/2003 | Fan ............ 382/170 |
| 2004/0085561 | A1 | | 5/2004 | Fromherz |
| 2004/0085562 | A1 | | 5/2004 | Fromherz |
| 2004/0088207 | A1 | | 5/2004 | Fromherz |
| 2004/0150156 | A1 | | 8/2004 | Fromherz et al. |
| 2004/0150158 | A1 | | 8/2004 | Biegelsen et al. |
| 2004/0153983 | A1 | | 8/2004 | McMillan |
| 2004/0216002 | A1 | | 10/2004 | Fromherz et al. |
| 2004/0225391 | A1 | | 11/2004 | Fromherz et al. |
| 2004/0225394 | A1 | | 11/2004 | Fromherz et al. |
| 2004/0247365 | A1 | | 12/2004 | Lofthus et al. |
| 2005/0036159 | A1 | | 2/2005 | Sharma et al. |
| 2005/0071104 | A1 | | 3/2005 | Viturro et al. |

OTHER PUBLICATIONS

Fan, et al., "Segmentation for Mixed Raster Contents with Multiple Extracted Constant Color Areas," SPIE vol. 5667, 2005, pp. 251-262.

Morgan, P.F., "Integration of Black Only and Color Printers", Xerox Disclosure Journal, vol. 16, No. 6, Nov./Dec. 1991, pp. 381-383.

Desmond Fretz, "Cluster Printing Solution Announced", Today at Xerox (TAX), No. 1129, Aug. 3, 2001.

U.S. Appl. No. 10/761,522, filed Jan. 21, 2004, Mandel et al.
U.S. Appl. No. 10/785,211, filed Feb. 24, 2004, Lofthus et al.
U.S. Appl. No. 10/881,619, filed Jun. 30, 2004, Bobrow.
U.S. Appl. No. 10/917,676, filed Aug. 13, 2004, Lofthus et al.
U.S. Appl. No. 10/917,768, filed Aug. 13, 2004, Lofthus et al.
U.S. Appl. No. 10/924,106, filed Aug. 23, 2004, Lofthus et al.
U.S. Appl. No. 10/924,113, filed Aug. 23, 2004, deJong et al.
U.S. Appl. No. 10/924,458, filed Aug. 23, 2004, Lofthus et al.
U.S. Appl. No. 10/924,459, filed Aug. 23, 2004, Mandel et al.
U.S. Appl. No. 10/933,556, filed Sep. 3, 2004, Spencer et al.
U.S. Appl. No. 10/953,953, filed Sep. 29, 2004, Radulski et al.
U.S. Appl. No. 10/999,326, filed Nov. 30, 2004, Grace et al.
U.S. Appl. No. 10/999,450, filed Nov. 30, 2004, Lofthus et al.
U.S. Appl. No. 11/000,158, filed Nov. 30, 2004, Roof.
U.S. Appl. No. 11/000,168, filed Nov. 30, 2004, Biegelsen et al.
U.S. Appl. No. 11/000,258, filed Nov. 30, 2004, Roof.
U.S. Appl. No. 11/051,817, filed Feb. 4, 2005, Moore et al.
U.S. Appl. No. 11/070,681, filed Mar. 2, 2005, Viturro et al.
U.S. Appl. No. 11/081,473, filed Mar. 16, 2005, Moore.
U.S. Appl. No. 11/069,020, filed Feb. 28, 2005, Lofthus et al.
U.S. Appl. No. 11/089,854, filed Mar. 25, 2005, Clark et al.
U.S. Appl. No. 11/090,498, filed Mar. 25, 2005, Clark.
U.S. Appl. No. 11/090,502, filed Mar. 25, 2005, Mongeon.
U.S. Appl. No. 11/095,378, filed Mar. 31, 2005, Moore et al.
U.S. Appl. No. 11/094,998, filed Mar. 31, 2005, Moore et al.
U.S. Appl. No. 11/094,864, filed Mar. 31, 2005, de Jong et al.
U.S. Appl. No. 11/095,872, filed Mar. 31, 2005, Julien et al.
U.S. Appl. No. 11/102,355, filed Apr. 8, 2005, Fromherz et al.
U.S. Appl. No. 11/084,280, filed Mar. 18, 2005, Mizes.
U.S. Appl. No. 11/109,566, filed Apr. 19, 2005, Mandel et al.
U.S. Appl. No. 11/109,558, filed Apr. 19, 2005, Furst et al.
U.S. Appl. No. 11/109,996, filed Apr. 20, 2005, Mongeon et al.
U.S. Appl. No. 11/093,229, filed Mar. 29, 2005, Julien.
U.S. Appl. No. 11/102,899, filed Apr. 8, 2005, Crawford et al.
U.S. Appl. No. 11/102,910, filed Apr. 8, 2005, Crawford et al.
U.S. Appl. No. 11/115,766, filed Apr. 27, 2005, Grace.
U.S. Appl. No. 11/102,332, filed Apr. 8, 2005, Hindi et al.
U.S. Appl. No. 11/136,959, filed May 25, 2005, German et al.
U.S. Appl. No. 11/122,420, filed May 5, 2005, Richards.
U.S. Appl. No. 11/137,634, filed May 25, 2005, Lofthus et al.
U.S. Appl. No. 11/137,251, filed May 25, 2005, Lofthus et al.
U.S. Appl. No. 11/137,273, filed May 25, 2005, Anderson et al.
U.S. Appl. No. 11/152,275, filed Jun. 14, 2005, Roof et al.
U.S. Appl. No. 11/156,778, filed Jun. 20, 2005, Swift.
U.S. Appl. No. 11/157,598, filed Jun. 21, 2005, Frankel.
U.S. Appl. No. 11/143,818, filed Jun. 2, 2005, Dalal et al.
U.S. Appl. No. 11/146,665, filed Jun. 7, 2005, Mongeon.
U.S. Appl. No. 11/166,299, filed Jun. 24, 2005, Moore.
U.S. Appl. No. 11/166,460, filed Jun. 24, 2005, Roof et al.
U.S. Appl. No. 11/166,581, filed Jun. 24, 2005, Lang et al.
U.S. Appl. No. 11/170,873, filed Jun. 30, 2005, Klassen.
U.S. Appl. No. 11/170,975, filed Jun. 30, 2005, Klassen.
U.S. Appl. No. 11/170,845, filed Jun. 30, 2005, Sampath et al.
U.S. Appl. No. 11/189,371, filed Jul. 26, 2005, Moore et al.
U.S. Appl. No. 11/212,367, Aug. 26, 2005, Anderson et al.
U.S. Appl. No. 11/208,871, Aug. 22, 2005, Dalal et al.
U.S. Appl. No. 11/215,791, filed Aug. 30, 2005, Hamby et al.
U.S. Appl. No. 11/234,468, filed Sep. 23, 2005, Hamby et al.
U.S. Appl. No. 11/234,553, filed Sep. 23, 2005, Mongeon.
U.S. Appl. No. 11/222,260, filed Sep. 8, 2005, Goodman et al.
U.S. Appl. No. 11/235,979, filed Sep. 27, 2005, Anderson et al.
U.S. Appl. No. 11/247,778, filed Oct. 11, 2005, Radulski et al.
U.S. Appl. No. 11/248,044, filed Oct. 12, 2005, Spencer et al.
U.S. Appl. No. 11/236,099, filed Sep. 27, 2005, Anderson et al.

* cited by examiner

GAMUT SELECTION IN MULTI-ENGINE SYSTEMS

BACKGROUND

Embodiments disclosed herein are related to the art of color consistency management in multi-engine systems. Illustrative embodiments will be described in terms of document production in imaging systems associated with a plurality of printing or marking engines. However, methods and systems disclosed herein are applicable to other environments. For example, methods and systems disclosed herein may be applied to environments that include plurality of display engines or other imaging devices. As such, references to documents, pages, document objects, pages or portions should be interpreted as references to similar portions of any image or group of images that might be displayed, printed or otherwise rendered viewable.

As used herein, gamut refers to a set or range of colors. Color producing engines, such as printing or marking engines and display devices, are associated with individual device gamuts or a set or range of colors each individual device can produce. While it may be a goal of an engine manufacturer that each unit of a particular model of color producing engine has the same gamut as every other unit of that engine model, manufacturing tolerances, age, wear, environment factors, such as temperature and humidity, as well as other factors, can cause gamuts to vary from unit to unit or individual engine to individual engine. Gamut variation between engines of different models or technologies can be even greater. Therefore, color consistency can be a challenge in systems that include a plurality of engines.

One approach to improving color consistency in multi-engine systems is based on tighter manufacturing tolerances and/or with more sophisticated controls. For example, United States Patent Application Publication No. US 2005/0071104 A1 by Viturro, et al., published Mar. 31, 2005, entitled METHOD FOR CALIBRATING A MARKING SYSTEM TO MAINTAIN COLOR OUTPUT CONSISTENCY ACROSS MULTIPLE PRINTERS, the disclosure of which is incorporated herein by reference in its entirety, discloses a method for maintaining consistent color output across printers even when associated in-line sensors have differences in accuracy due to various technical and environmental factors.

Another approach to maintaining color consistency is to determine an intersection gamut or a gamut common to all the engines associated with the system or with the production of a document and to transform image data of an entire document or job to include only colors that are within the gamuts of, or are achievable by, all of the associated engines. For instance, United States Patent Application Publication No. US 2005/0036159 A1 by Sharma, et al., published Feb. 17, 2005, entitled SYSTEM AND METHOD FOR OBTAINING COLOR CONSISTENCY FOR A COLOR PRINT JOB ACROSS MULTIPLE OUTPUT DEVICES, the disclosure of which is incorporated herein by reference in its entirety, discloses a method which involves identifying a group of devices to which a job is intended to be rendered, obtaining color characteristics from devices in the identified group and mapping colors in the original job to the output devices common gamut, i.e., intersection of the gamuts of the individual printers.

However, improved controls can be expensive to design and implement and may not always be available. The intersection gamut of a plurality of engines is likely to be smaller or include fewer colors than the individual gamut of any particular engine in the plurality. Therefore, images prepared for rendering with an intersection gamut may be less vibrant or less accurate than they would be if prepared for rendering with the gamut of a selected individual engine. In some cases, consistency can be less important or desirable than color accuracy or vibrance. Therefore, there has been a desire for systems and methods that prepare documents or images for rendering or production through the intelligent selection of target gamuts.

CROSS REFERENCE

The following applications, the disclosures of each being totally incorporated herein by reference, are mentioned:

U.S. application Ser. No. 10/917,676, filed Aug. 13, 2004, entitled "MULTIPLE OBJECT SOURCES CONTROLLED AND/OR SELECTED BASED ON A COMMON SENSOR," by Robert M. Lofthus, et al.;

U.S. Pat. No. 6,959,165, issued Oct. 25, 2005, entitled "HIGH RATE PRINT MERGING AND FINISHING SYSTEM FOR PARALLEL PRINTING," by Barry P. Mandel, et al.;

U.S. application Ser. No. 10/999,326, filed Nov. 30, 2004, entitled "SEMI-AUTOMATIC IMAGE QUALITY ADJUSTMENT FOR MULTIPLE MARKING ENGINE SYSTEMS," by Robert E. Grace, et al.;

U.S. application Ser. No. 11/070,681, filed Mar 2, 2005, entitled "GRAY BALANCE FOR A PRINTING SYSTEM OF MULTIPLE MARKING ENGINES," by R. Enrique Viturro, et al.;

U.S. application Ser. No. 11/081,473, filed Mar 16, 2005, entitled "PRINTING SYSTEM," by Steven R. Moore;

U.S. application Ser. No. 11/084,280, filed Mar 18, 2005, entitled "SYSTEMS AND METHODS FOR MEASURING UNIFORMITY IN IMAGES," by Howard Mizes;

U.S. application Ser. No. 11/090,502, filed Mar. 25, 2005, entitled IMAGE QUALITY CONTROL METHOD AND APPARATUS FOR MULTIPLE MARKING ENGINE SYSTEMS," by Michael C. Mongeon;

U.S. application Ser. No. 11/095,378, filed Mar. 31,2005, entitled "IMAGE ON PAPER REGISTRATION ALIGNMENT," by Steven R. Moore, et al.;

U.S. application Ser. No. 11/109,558, filed Apr. 19, 2005, entitled "SYSTEMS AND METHODS FOR REDUCING IMAGE REGISTRATION ERRORS," by Michael R. Furst, et al.;

U.S. application Ser. No. 11/109,996, filed Apr. 20, 2005, entitled "PRINTING SYSTEMS," by Michael C. Mongeon, et al.;

U.S. application Ser. No. 11/115,766, Filed Apr. 27, 2005, entitled "IMAGE QUALITY ADJUSTMENT METHOD AND SYSTEM," by Robert E. Grace;

U.S. application Ser. No. 11/143,818, filed Jun. 2, 2005, entitled "INTER-SEPARATION DECORRELATOR," by Edul N. Dalal, et al.;

U.S. application Ser. No. 11/146,665, filed Jun. 7, 2005, entitled "LOW COST ADJUSTMENT METHOD FOR PRINTING SYSTEMS," by Michael C. Mongeon;

U.S. application Ser. No. 11/170,975, filed Jun. 30, 2005, entitled "METHOD AND SYSTEM FOR PROCESSING SCANNED PATCHES FOR USE IN IMAGING DEVICE CALIBRATION," by R. Victor Klassen;

U.S. application Ser. No. 11/170,873, filed Jun. 30, 2005, entitled "COLOR CHARACTERIZATION OR CALIBRATION TARGETS WITH NOISE-DEPENDENT PATCH SIZE OR NUMBER," by R. Victor Klassen;

U.S. application Ser. No. 11/170,873, filed Jun. 30, 2005, entitled "COLOR CHARACTERIZATION OR CALIBRA- TION TARGETS WITH NOISE-DEPENDENT PATCH SIZE OR NUMBER," by R. Victor Klassen;

U.S. application Ser. No. 11/189,371, filed Jul. 26, 2005, entitled "PRINTING SYSTEM," by Steven R. Moore, et al.;

U.S. application Ser. No. 11/222,260, filed Sep. 8, 2005, entitled "METHOD AND SYSTEMS FOR DETERMINING BANDING COMPENSATION PARAMETERS IN PRINTING SYSTEMS", by Goodman, et al.;

INCORPORATION BY REFERENCE

PICTURE-GRAPHICS COLOR IMAGE CLASSIFICATION by Salil Prabhakar, Hui Cheng, John C. Handley, Zhigang Fan and Ying-wei Lin, published by IEEE ICIP, 2002; and SEGMENTATION FOR MIXED RASTER CONTENTS WITH MULTIPLE EXTRACTED CONSTANT COLOR AREAS by Zhigang Fan and Timothy Jacobs, Proceedings of SPIE-IS&T Electronics Imaging, Vol. 5667, 2005 SPIE and IS&T, are incorporated herein by reference in their entirety for all they disclose.

BRIEF DESCRIPTION

A method for preparing to produce a multi-page document in a multi-engine system can include identifying objects within the document, identifying characteristics of the identified objects and selecting a respective target gamut for processing each respective identified object based upon at least the respective identified characteristics of the respective identified object.

One embodiment includes identifying respective objects within the document to have respective characteristics of being one of: a graphic object, a pictorial object, a normal text or line object and a large text or line object and selecting a respective target gamut for processing each respective identified object based upon at least the respective identified characteristic of the respective identified object, the selected respective target gamut being one of: a gamut of a selected individual engine, an intersection of a respective plurality of gamuts associated with the plurality of engines and a blended combination of a gamut of a selected individual engine and an intersection of a respective plurality of gamuts associated with the plurality of engines, the selecting being based upon at least the respective identified characteristics of the respective identified object.

In some situations selecting a respective target gamut can include selecting an individual engine gamut as the target gamut for the object, if the object is identified as a normal text or line object.

Sometimes selecting a respective target gamut can include determining, for each identified large text or line object, pictorial object and/or graphic object, a similarity to other identified large text or line objects, pictorial objects and graphic objects in the document, thereby associating large text or line objects, pictorial objects and graphic objects in the document with groups of similar large text or line objects, pictorial objects and graphic objects, selecting an intersection of a respective plurality of gamuts, associated with the plurality of engines as a respective target gamut for respective groups of similar large text or line objects, pictorial objects and/or graphic objects having a group characteristic that meets a selected criteria, and selecting mapping to at least one individual engine gamut of at least one selected engine as the respective at least one target gamut for respective groups of similar large text or line objects, pictorial objects and/or graphic objects having a group characteristic that does not meet the selected criteria.

A document processing system can include an object identifier, a characteristic identifier and a gamut selector. For example the object identifier can be operative to identify image objects within the document. The characteristic identifier may be operative to identify characteristics of the identified objects. The gamut selector may be operative to select a respective target gamut for processing each respective identified object based upon at least the respective identified characteristics of the respective identified object.

DETAILED DESCRIPTION

Figure 1:
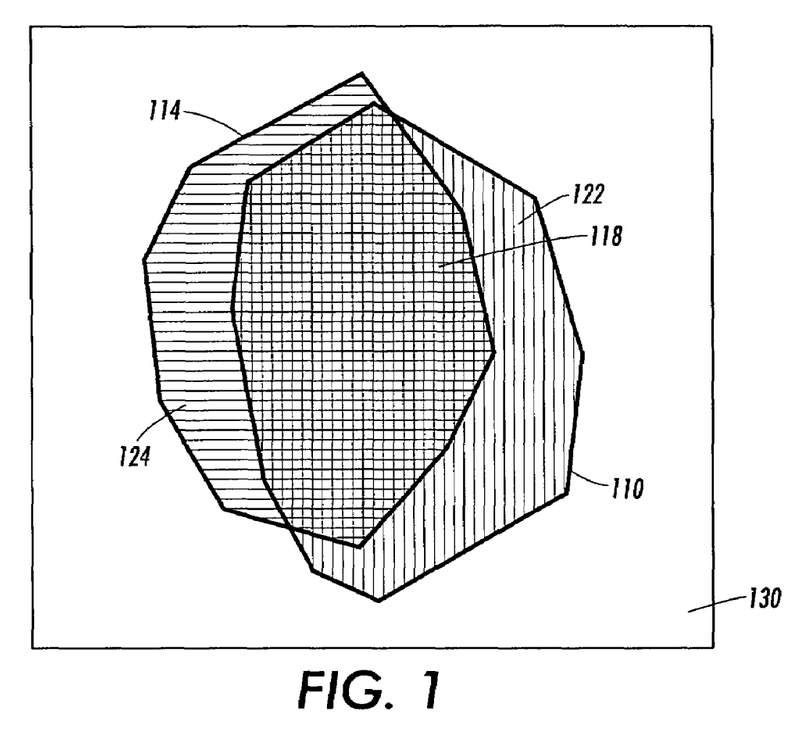
FIG. 1 is a Venn diagram depicting a relationship between respective first and second illustrative gamuts associated with respective first and second illustrative engines.

Referring to FIG. 1, a first illustrative gamut 110 associated with a first engine (e.g., see FIG. 6) and a second illustrative gamut 114 associated with the second engine (e.g., see FIG. 6) partially overlap or have an illustrative common or intersection gamut 118. The first 110 and second 114 gamuts may include respective first 122 and second 124 non-intersecting portions. The first non-intersecting portion 122 represents those colors that cannot be produced by the second engine but that can be produced by the first engine. The second non-interesting portion 124 represents those colors that cannot be produced by the first engine but can be produced by the second engine. An area 130 outside both the first 110 and second 114 gamuts represents colors that are unattainable or un-producible by either the first or second engine. Where systems are associated with additional (i.e., more than two) engines, additional gamuts might also be considered. It is likely that a common or intersection gamut of all the gamuts associated with all the engines would be smaller than an intersection gamut of any two of the engines of the plurality.

Where consistency is important, or where inconsistency would be noticeable and/or objectionable and where a document is to be produced in a system wherein portions of the document may be produced with different engines (e.g., the engines associated with the first and second gamuts 110, 114), it may be desirable to map images or objects in the document to an intersection gamut (e.g., 118). For instance, it may be desirable that objects, such as, repeated logos and the like, are consistent throughout a document, even if separated occurrences of the objects are rendered or produced on or by different engines. However, there may be instances where consistency is less important. Moreover, there may be instances where it is desirable to take advantage of the full gamut (e.g., 110 or 114) of a selected engine. For example, where a photograph or pictorial image occurs only once in a document, it may be desirable to render the colors of the pictorial image as accurately as possible. Therefore, it may be desirable to map a gamut of a pictorial image to the individual gamut (e.g., 110 or 114) of a selected engine; since it is more likely that an accurate match to a color in the pictorial will be found in the larger individual gamuts (e.g., 110 or 114) than it is an accurate match will be found in the smaller intersection gamut (e.g., 118).

Figure 2:
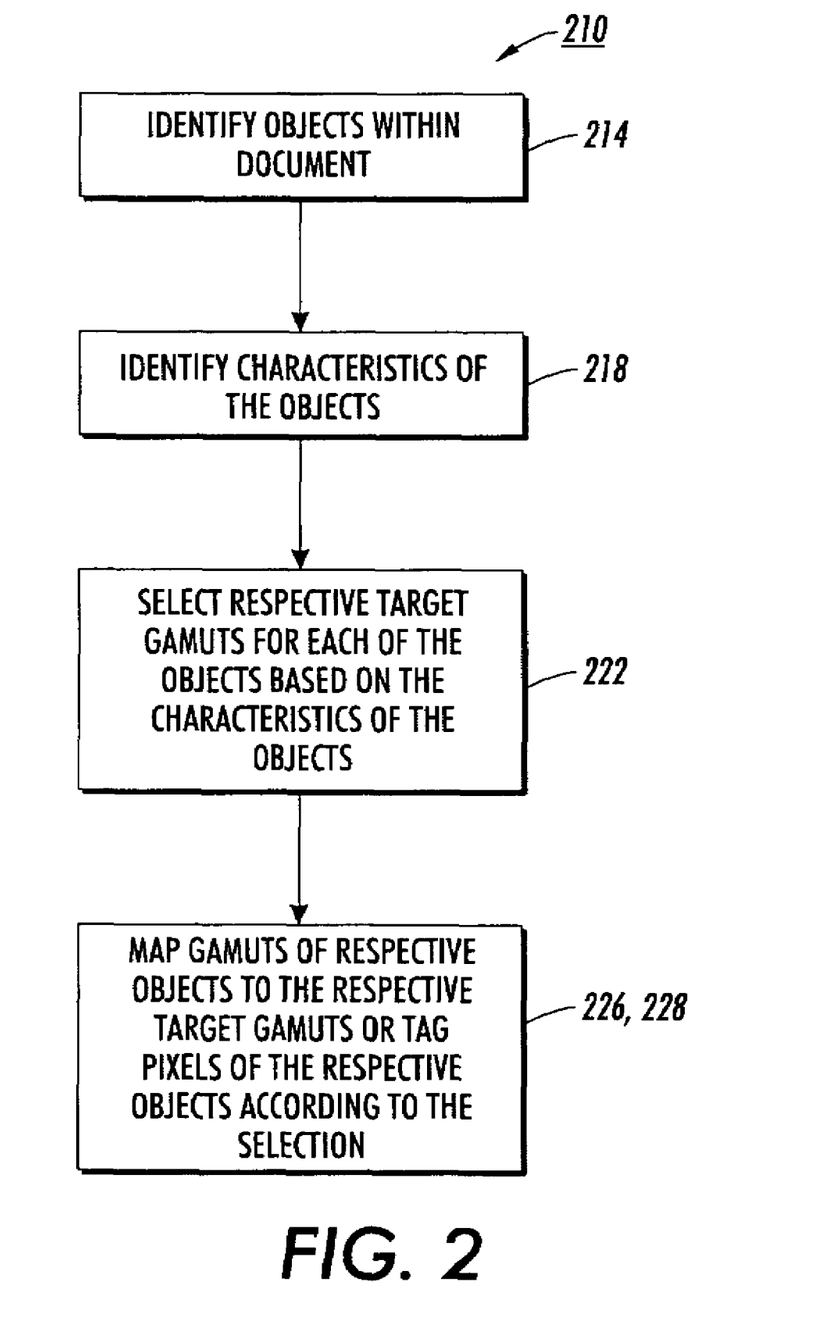
FIG. 2 is a flow chart outlining a method for preparing to produce a multi-page document in a multi-engine system.

Referring to FIG. 2, a method 210 for preparing to produce a multi-page document in a multi-engine system includes identifying 214 objects within the document, identifying 218 characteristics of the identified 214 objects and selecting 222 respective target gamuts for each of the identified 214 objects based on the identified 218 characteristics of the objects. Optionally, gamuts of the respective objects may be mapped 226 to the respective target gamuts or tagged 228 according to the selection 222 for later mapping 226.

Identifying 214 objects within the document and identifying 218 characteristics of the objects may occur in separate stages or may occur simultaneously or contemporaneously as part of a single process. For example, when a document is authored or generated directly in electronic form with, for example, desktop publishing, word processing or slide presentation generation software, objects or pixels of the objects in the document are often tagged with information that associates the pixels with a particular object. Tags may also be provided that identify the type of object or other characteristic of the object. When documents or images are generated in this manner, identifying objects and identifying characteristics may include reading the tags associated with the pixels that make up the objects. Alternatively, a document or image might not include authoring or tag information. For example, a document may be received as a result of a scanning operation, the results of which do not include or provide object classification or tag information. In such cases, identifying 214 objects within the documents or image can include performing segmentation procedures. For instance, segmentation procedures identify regions or pixels associated with text, lines or curves, regions or pixels associated with pictorial images and regions or pixels associated with graphic objects such as charts and graphs. Identifying groups of pixels identified with text, pictorial images or graphic objects is a form of identifying 214 objects within the document. Determining that the regions or objects are text, pictorial or graphic in nature is a form of identifying 218 characteristics of the objects. Alternatively, or additionally, identifying 218 characteristics of the objects can include performing further analysis or identifying 218 additional characteristics. Graphic objects, such as, for example, pie and bar charts, are sometimes further segmented into sub-objects, such as individual bars or pie wedges. Unless otherwise indicated, references to graphic objects made herein should be construed to include references to sub-objects in the alternative.

Selecting 222 respective target gamuts for each of the objects can be as simple as always selecting 222 a gamut of an individual engine when an object is identified to be a pictorial object and selecting a common or intersection gamut (e.g., 118) for objects identified as colored text or lines. Alternatively, additional characteristics of the objects can be identified 218 and considered, as will be discussed in greater detail below.

Figure 3:
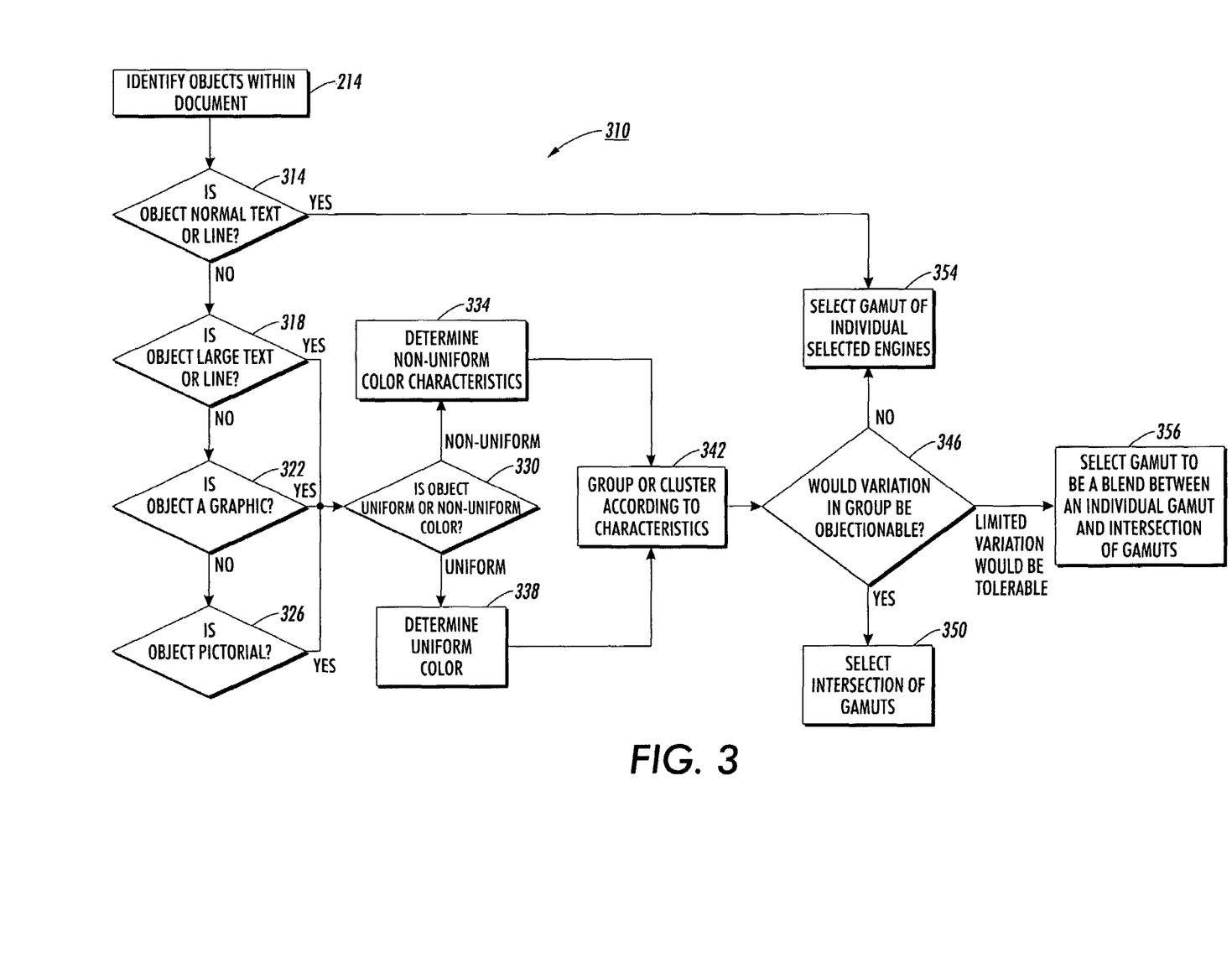
FIG. 3 is a flow chart outlining an embodiment of the method of FIG. 2.

For example, referring to FIG. 3, an illustrative embodiment 310 of the method 210 for preparing to produce a multi-page document in a multi-engine system can include identifying 214 objects within the document as described above. Identifying 218 characteristics of the objects can include determining 314 if an identified 214 object has the characteristics of normal text or a normal line, determining 318 if the identified 214 object has the characteristics of large text or lines, determining 322 if the identified 214 object has the characteristics of a graphic object and determining 326 if the identified 214 object has the characteristics of a pictorial image. Additionally, identifying 218 characteristics of the objects can include determining 330 if the identified 214 object is of a uniform or non-uniform color. Furthermore, when the object is determined 330 to be of a non-uniform color, identifying 218 characteristics of the object can further include determining 334 further characteristics of the particular combination or collection of colors. When the object is determined 330 to be of a uniform color, identifying 218 characteristics of the object can include determining 338 or identifying the particular uniform color.

These identified 218 characteristics can be considered in the target gamut selection 222 process. For instance, the identified 218 characteristics can be used to group or cluster 342 objects according to their characteristics. For instance, clustering objects in this manner allows the distribution of similar objects throughout a document to be considered in the target gamut selection 222 process. For instance, the identified 218 characteristics (e.g., 314, 318, 322, 326, 330, 334, 338) including the clustering 342 or similarity of an object to other objects in the document can be considered or evaluated in a determination 346 as to whether or not gamut-related variation between the object and other similar objects would be objectionable. Where variation would be objectionable, selecting 222 a respective target gamut for the object can include selecting 350 an intersection gamut (e.g., 118). Where it is determined 346 that variation would not be objectionable, selecting 222 the respective target gamut for the object can include selecting 354 the gamut of an individual selected engine.

Figure 4:
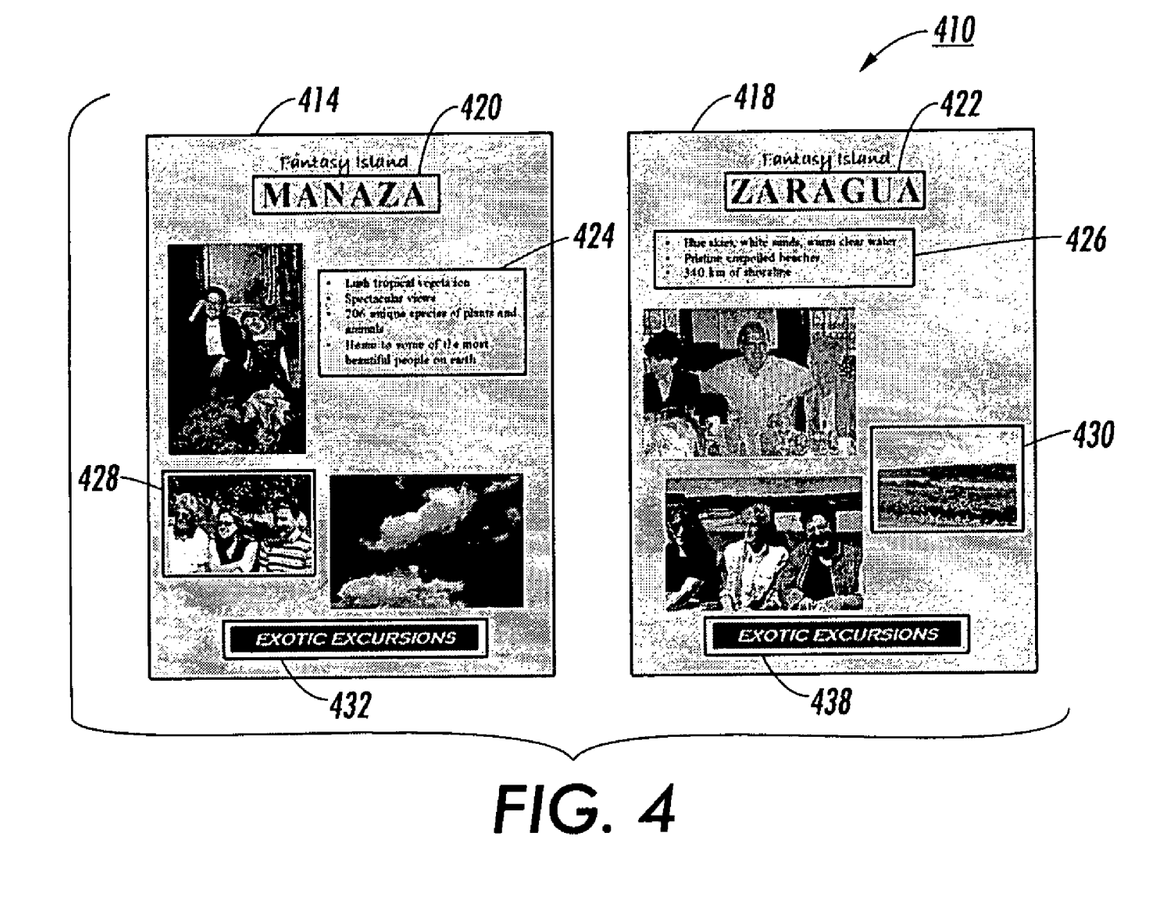
FIG. 4 is a diagram of an illustrative portion of a multi-page document.

For example, referring to FIG. 4, a document 410 includes a first page 414 and a second page 418. Illustrative objects 420-438 within the document 410 may be identified 214. Characteristics of the objects 420-438 may also be identified 218. For instance, a determination 318 may be made that a first object 420 and a second object 422 include characteristics of large text or lines. A third object 424 and a fourth object 426 may be determined 314 to include characteristics of normal text or lines. The definition of normal text or line characteristics and large text or line characteristics may vary from application to application. For instance, in some applications, text larger than a 24-point font size might be considered large. In other applications, a threshold object size might be 12 or 14 point. In still other applications, line or text dimensions on the order of a quarter inch might be considered normal or small. The dividing line or threshold between determinations 314, 318 of normal or large text or lines can be based on the size at which differences in gamuts of selected engines begin to be noticeable or objectionable.

A determination 326 may also be made that fifth 428 and sixth 430 identified 214 objects are of the pictorial class. For instance, the fifth 428 and sixth 430 objects include a wide range of colors and are surrounded by pixels of uniform color. Seventh and eighth objects 432, 438 may be determined to have the characteristics of a graphic object. For instance, the seventh and eighth objects 432, 438 include a significant region of a solid color and include a border having a regular geometric shape. Alternatively, some embodiments may have identified the seventh and eighth objects as including sub-objects. For example, the seventh and eighth objects 432, 438 may have been identified as including a background graphic sub-object and a large text foreground object.

As indicated above, respective target gamuts may be selected 222 for each of these objects 420-438 based on these identified 218 characteristics (e.g., 314, 318, 322, 326) alone. For instance, in the illustrative embodiment 310, selecting 222 a respective target gamut for an object includes selecting 354 the gamut of an individual selected engine for all objects determined 314 determined to include the characteristics of normal text or lines because, for example, engine-to-engine gamut variation is not expected to be noticeable in the relatively small structures of normal text and lines in the illustrative application.

Alternatively, as indicated above, additional characteristics may be identified 218 and considered in the target gamut selection 222 process. For instance, the similarity and/or relative position of an object to other objects in the document may be considered when selecting 222 a respective target gamut for a respective object.

For instance, similar objects are clustered 342 together and a target gamut selected for objects in the group or cluster based on characteristics of the groups or clusters or elements thereof.

For example, a cluster may consist of all of the large text or line objects in the document. A second group or cluster may consist of all the graphic objects in a document, and a third group or cluster may consist of all the pictorial objects in a document. Alternatively, objects may be clustered by color or color characteristics. For instance, objects having the same or similar colors may be considered as a group or cluster. In yet another alternative, objects might be considered similar only when they are of the same type (e.g., large text or line, graphic or pictorial) and of the same or similar color or range of colors. That is, in some embodiments, large red text and a large red section of a bar or pie chart might be considered similar and included in the same cluster. In other embodiments, large red text and red graphic objects might be grouped in separate clusters and considered relatively dissimilar.

Where color is a characteristic used to group or cluster 342 objects, determining 330 whether an object is of a uniform color or non-uniform color allows for simplified processing for those objects characterized or identified 218 as being of uniform color.

Those objects or objects of a particular type (e.g., text, graphic or pictorial) can be grouped or clustered according to that color or narrow range of colors. Those objects determined 330 to be of non-uniform color, such as, for example, photographs, color sweeps, and text of fanciful fonts wherein the colors of letters vary as in a rainbow or color sweep, require further analysis determine or quantify 334 a similarity between objects. For instance, a color histogram can be determined for each object being considered. These histograms of the non-uniform color objects or non-uniform color objects of the same type (e.g., large text or line, graphic or pictorial) may then be compared for similarity. The judgment as to whether two or more histograms are similar may be based on variations or lack thereof in the shape of the histogram or the ratios or percentages of each color in the object as identified by the creation of the histogram. It is to be understood that histograms need not be actually drawn or rendered, and that although the phrase—histogram and shape—are used here, these terms are meant to refer to an analysis of numerical data, such as a count of pixels of particular colors or ranges of particular colors in a given object and ratios or percentages thereof and not necessarily an analysis of a chart, graph or plot.

Additional characteristics may be used to further contribute to the analysis of similarity. For example, the size of objects may be considered during the grouping or clustering 342 process. That is, for example, even though two pictorial objects have similar histograms, they may be grouped, clustered or considered separately if one object includes a large number of pixels or extends over a large image area and the other object includes a relatively small number of pixels or extends only over a small portion of a page or image surface.

Other characteristics or aspects of objects may also be considered. For example, the first object 420 and the second object 422 may include only pixels of the same color. Nevertheless, in some embodiments, if the first object 420 includes different text characters or a different arrangement of text characters from the second object 422, the objects 420, 422 may be considered dissimilar and included in separate groups or clusters. In other embodiments, large text objects may be considered similar as long as their colors are similar even if, for example, the letters and the size of letters in the text objects are different.

The determination 346 as to whether or not engine gamut-related color variations between members of a group of or cluster would be objectionable can be based on characteristics of the group or cluster. For example, the number of objects in a group or cluster can be a factor in determining whether variation would be detectable or objectionable. For instance, where a group or cluster includes only one member, variation in color for the members of the group would not be an issue. Therefore, variation would not be objectionable and a gamut of a selected engine may be safely selected 354 for the single member of the group. As the number of members in a group or cluster increases, additional characteristics of the members of the cluster or of the members of the cluster in relation to one another may be considered. For instance, if a cluster includes only two members, and those members are located on different and widely separated pages (e.g., page 2 and page 200), it may be determined 346 that variation between the members of the cluster would not be objectionable. Alternatively, in some embodiments or applications, if the objects are located on pages such that an observer might observe both objects while flipping through the pages of the document even though the objects are separated by a great number of pages, it might be determined 346 that variation between the objects would be objectionable.

Any appropriate criteria may be used to determine 346 whether or not variation in a group would be objectionable. As indicated above, one criterion that could be used is simply the number of members of a group. Additionally, or alternatively, a page-wise density or frequency of occurrence of the objects in a group or cluster may be used to predict or make a judgment 346 with regard to the acceptability of gamut variation within a group or cluster of similar objects. For instance, if the objects in a group, or a significant number of the objects in a group, occur relatively close together in a document, gamut variation may be judged 346 to be objectionable. For instance, when similar objects occur on the same page or on facing pages (e.g., if the first page 414 and the second page 418 are, for example, the second and third pages of a document and, therefore, viewable at the same time) the likelihood that gamut variation would be judged 346 to be objectio However, in some embodiments, even if the page-wise density of similar objects (i.e., objects associated with a cluster) is such that the objects do not occur on facing pages, but are within some threshold number of pages of each other, such as, for example, within the pages of a chapter of a book or booklet, variation between the objects may be judged 346 to be more objectionable than if the similar objects of a group or cluster were distributed less densely throughout the document.

Object size may also be a factor or criteria considered in the evaluation 346 as to whether engine gamut-related variation in similar objects might be objectionable. For instance, variation in small objects might be considered to be more tolerable or less objectionable than similar engine gamut-related variations would be in larger objects.

Yet another criterion, considered in some embodiments, is a flip-page criterion, such as that alluded to above. That is, if similar objects are located on separate pages, but located on those pages so that the objects would be viewable simultaneously or in rapid succession as an observer thumbs or flips through the pages, the likelihood that gamut-related variations in the similar objects would be considered 346 objectionable increases.

Any or all of these criteria, as well as others, may be considered in any one embodiment. For example, the evaluation or determination 346 as to whether engine gamut-related variation would be objectionable for a given group or cluster, or members of a group or cluster, of similar objects may be based on a function, combination or weighted combination of evaluations related to each selected criteria. For example, the number of objects criteria, the page-wise density criteria, the object size criteria and/or the flip-page criteria discussed above may be considered in combination.

As indicated with regard to the embodiment 310 illustrated in FIG. 3, an evaluation 346 that gamut-related variation in members of a group would not be objectionable can lead to the selection 354 of a gamut of a selected individual engine as the target gamut for those objects. If gamut-related variation in members of a group or cluster is evaluated 346 to be objectionable, the intersection gamut of the gamuts of the available or associated engines may be selected 350 to be the target gamut for the objects.

However, the selected target gamut does not have to be either a gamut of an individual engine or an intersection gamut. Instead, the selected 222 gamut may be selected 356 to be a weighted blend between a gamut (e.g., 110 or 114) of a selected engine and an intersection gamut (e.g., 118). For example, a numeric value or level of objectionability or tolerability of engine gamut-related variation in a group or cluster of objects can be determined. For example, such a numeric value can be generated based on one or more criteria, such as, for example, the number of objects criteria, the page-wise density criteria, the size criteria and/or the flip-page criteria discussed above. This objectionability or tolerability factor can be used to determine how much a selected target gamut may vary from an intersection gamut (e.g., 118) toward the gamut of a selected engine.

Figure 5:
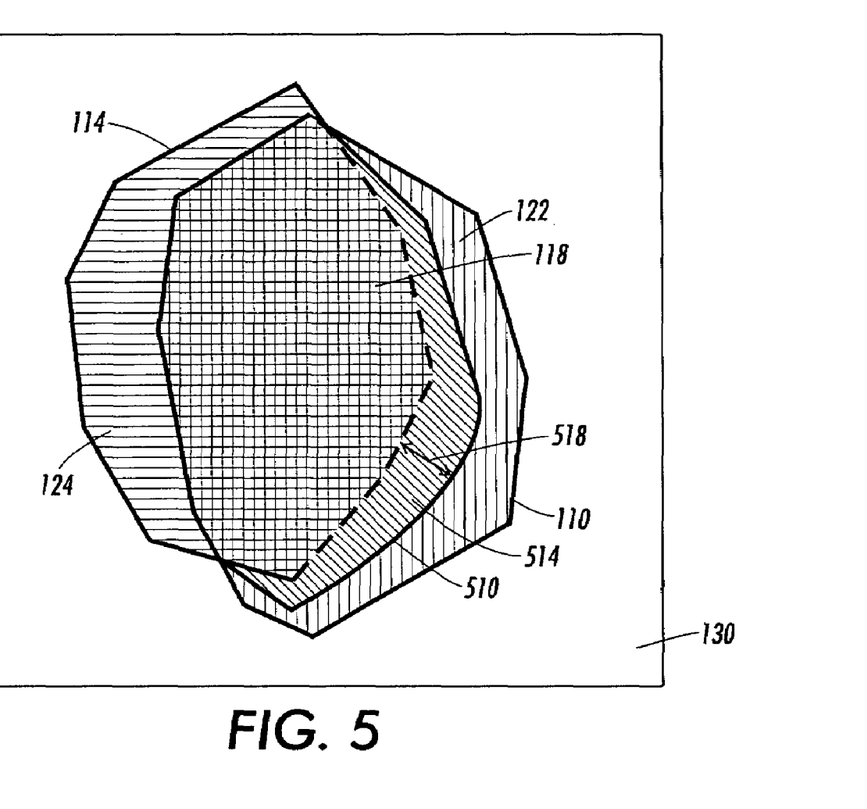
FIG. 5 is a Venn diagram showing an overlap or intersection of two gamuts and a blended gamut including the intersection gamut and an additional portion of one of the two gamuts.

For example, referring to FIG. 5, a selected blended gamut 510 includes the intersection gamut 118 and a portion 514 of the portion 122 of the first gamut 110 that is not included in the intersection gamut 118. The extent 518 to which the selected gamut 510 extends into the portion 122 of the first gamut 110 representing colors that are unobtainable by other engines in the system (e.g., the engine associated with the second gamut 114) can be a function of this objectionability or tolerability value. For instance, when gamut-related variation in objects has a low objectionability, the selected blended gamut 510 may extend completely into the region 122 of the first gamut 110 that is unobtainable by the other engines. When the objectionability value is low, the selected blended gamut 510 may extend only a very small amount into the region 122 of the first gamut that is unobtainable by the other engines. When the objectionability value is moderate, then the selected blended gamut 510 may extend, as shown in FIG. 5, a moderate amount into the region 122 of the first gamut that is obtainable by the other engines. Mapping the colors of objects to this intermediate gamut would limit the variability between objects, assuming other objects are rendered by other engines (e.g., the engine associated with the second gamut 114), while at the same time at least partially taking advantage of the ability of the engine associated with the first gamut 110 to produce colors outside the intersection gamut (e.g., 118).

As indicated above, once a target gamut is selected 222 for a given object or group or cluster of objects, colors of those objects may be mapped 226 to colors available in the selected 222 gamut. Alternatively, the objects or pixels of the objects may be tagged 228 to include a selected gamut identifier to prepare the object or document for gamut mapping at another time or by another device or portion of a device.

Figure 6:
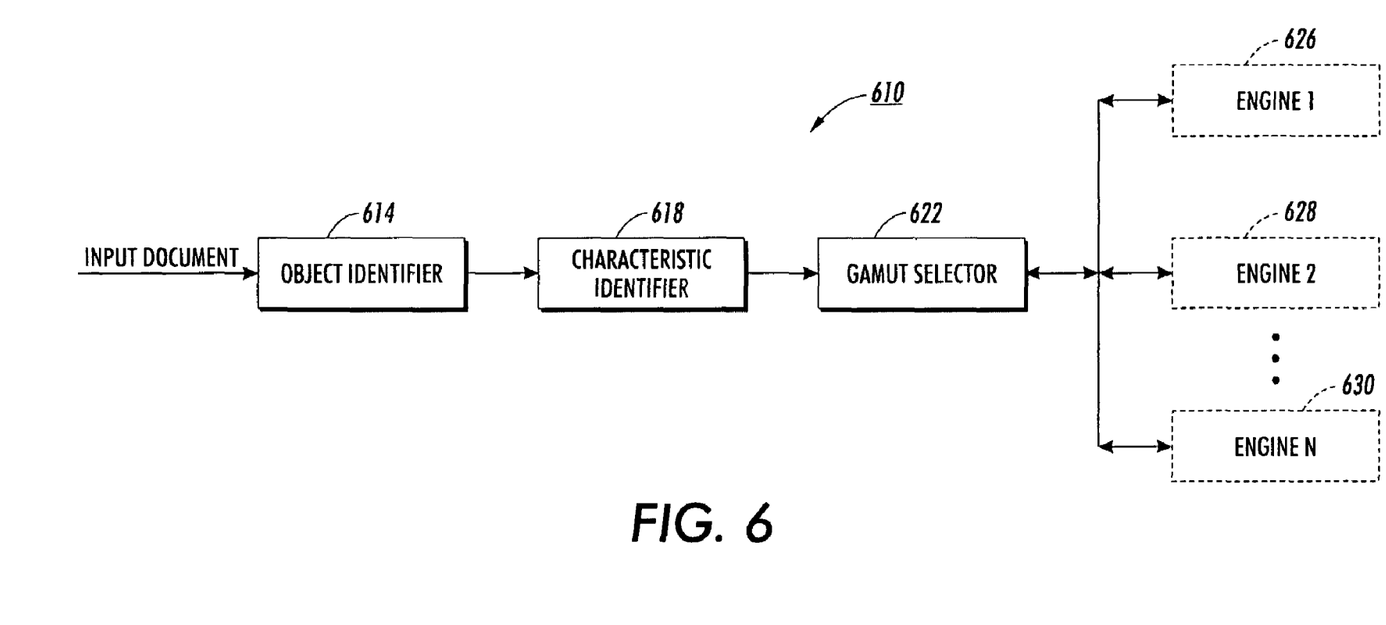
FIG. 6 is a block diagram of an illustrative system that is operative to perform the method of FIG. 2.

Referring to FIG. 6, a document processing system 610 can include an object identifier 614, a characteristic identifier 618 and a gamut selector 622.

For instance, the object identifier 614 is operative to identify 214 objects within a document. For instance, the object identifier 614 may identify 214 objects within a document by reading or identifying tags associated with the pixels or other data related to or associated with the objects. Additionally, or alternatively, the object identifier 614 may use segmentation and/or other image analysis techniques to identify 214 objects within an image or document.

The characteristic identifier 618 may be operative to identify 218 characteristics of objects identified 214 by the object identifier 614. For instance, the characteristic identifier 618 may be operative to determine 314, 318, 322, 326 or identify 218 that an identified 214 object has the characteristic of, or of being, a normal text or line object, large text or line object, graphic object or sub-object or a pictorial object. For instance, the characteristic identifier 618 may be operative to read tags associated with pixels of identified 214 objects. Alternatively, or additionally, the characteristic identifier 618 may be operative to use segmentation and/or other image processing techniques to determine 314, 318, 322, 326 that an object is a normal text or line object, a large text or line object, a graphic object or a pictorial object. Additionally, or alternatively, the characteristic identifier 618 may be operative to identify 218 other characteristics. For instance, the object identifier 618 may determine 330 if an object is of uniform or non-uniform color. Furthermore, the characteristic identifier 618 may determine or identify 338 a particular uniform color of an object or determine 334 aspects of a particular combination or collection of colors included in or that make up an object. For instance, the characteristic identifier 618 may generate and evaluate histograms analyzing the colors in an object.

The gamut selector 622 may be operative to select 222 a respective target gamut for processing each respective identified 214 object based upon at least the identified 218 characteristics of the respective identified 214 objects. For instance, the identified 218 characteristics may be used to determine 346 whether or not engine gamut-related variations would be objectionable in rendered or printed versions of the objects. For example, similar identified 214 objects may be clustered 342 together and considered as a group. That is, identified 214 objects having the same or similar identified 218 characteristics with regard to, for example, size, shape, color, combinations or collections of color and/or objects identified as the same or similar object types, such as being normal text or lines, large text or lines, graphic objects, or pictorial objects may be grouped or clustered 342 together as sets of similar objects.

In order to allow similar objects, for which the gamut selector 622 determines 346 engine gamut-based variations would be objectionable, to be rendered or printed with engines having different gamuts, the gamut selector 622 selects 222, 350 a target gamut, for those objects, that is an intersection of the gamuts of associated engines (e.g., 626-630 or a selected subset thereof). When the gamut selector 622 determines 346 that engine gamut-related variations would not be objectionable with regard to a particular set or group of similar objects, the gamut selector 622 may select 222, 354 target gamuts, for those objects, that are the gamuts of individual selected engines (e.g., 626, 628 or 630) which will be used to render or print the individual objects.

Alternatively, the gamut selector 622 may be operative to select 222 a respective target gamut for a respective object or set of objects by selecting 356 a gamut that is a blend between the gamut of a selected individual engine (e.g., one of 626, 628 and 630) and an intersection of a respective plurality of gamuts of associated engines (e.g., 626, 628 and 630), or a selected subset thereof. For example, as discussed above with reference to FIG. 5, the gamut selector 622 may select a blended gamut (e.g., 510) based upon at least respective identified. 218 characteristics of the respective identified 214 objects.

The gamut selector 622 may determine whether or not members of various groups or clusters meet certain criteria or combinations of criteria and select 222, 350, 354, 356 a target gamut for an object to be an intersection gamut (e.g., 118), an individual gamut (e.g., 110, 114) or a gamut (e.g., 510) that is a blend between an intersection gamut 118 and an individual gamut (e.g., 110) of a selected engine (e.g., 626, 628 or 630) by considering whether or not the members of a group or cluster meet criteria relative to, for example, a number of similar objects in the group, a page-wise density of some or all of the objects in the group, a size of some or all of the objects in the group, locations of objects within the document in relation to a flip-page criteria and/or other criteria. Moreover, the gamut selector 622 may select 222, 346, 350, 354 356 based on a combination or function of such criteria. The gamut selector 622 may opt to perform 266 the mapping of colors of objects to the selected 222 target gamut or to label or tag 228 objects or pixels of objects according to the selected 222 target gamut.

The object identifier 614, characteristic identifier 618, and gamut selector 622 may be implemented in various combinations of hardware and software and included in various programs and devices including, for example, word processors, document processors, business presentation packages, desktop publishers, publishing equipment, photocopiers, printers, authoring tools, digital copiers, bookmaking machines, facsimile machines or other devices which print, display or prepare images or documents for printing or display. The association of the engines (e.g., 626, 628 or 630) with the system 610 may be a close association (e.g., where the engines are included in the same device as the other elements (i.e., 614, 618, 622) or in immediate communication therewith), or the association may be a loose one (e.g., wherein the engines may be distributed over a wide geographical area and/or incorporated in other devices, and may communicate with the gamut selector 622 over a network or receive data from the gamut selector via physical media such as floppy disks, CD ROM and/or memory sticks and the like).

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

The invention claimed is:

1. A method for preparing to produce a multi-page document in a multi-engine system, the method comprising:
   identifying objects within the document;
   identifying, by at least one component of the multi-engine system, characteristics of the identified objects, wherein identifying characteristics of the identified objects comprises identifying respective objects to be one of a graphic object, a pictorial object, a normal text or line object and a large text or line object;
   selecting a respective target gamut for processing each respective identified object based upon at least the respective identified characteristics of the respective identified object, wherein selecting a respective target gamut comprises:
   determining, for each identified large text or line object, pictorial object and/or graphic object, a similarity to other identified large text or line objects, pictorial objects and/or graphic objects in the document, thereby associating large text or line objects, pictorial objects and/or graphic objects in the document with groups of similar large text or line objects, pictorial objects and/or graphic objects,
   selecting an intersection of a respective plurality of gamuts, associated with the plurality of engines as a respective target gamut for respective groups of similar large text or line objects, pictorial objects and/or graphic objects having a group characteristic that meets a selected criteria; and
   selecting a blended combination of a gamut of a selected individual engine and an intersection of a respective plurality of gamuts associated with the plurality of engines as a respective target gamut for a respective group of similar large text or line objects, pictorial objects and/or graphic objects having a group characteristic that does not meet the selected criteria; wherein determining, for each identified large text or line object, pictorial object and/or graphic object, a similarity to other identified large text or line objects, pictorial objects and/or graphic objects in the document comprises at least one of:
   identifying clusters of large text or line objects and/or graphic objects and sub-objects that have a same or nearly a same uniform color; and
   identifying clusters of large text or line objects, pictorial objects and/or graphic objects and sub-objects that have the same or nearly the same combination or collection of colors.

2. The method of claim 1 wherein selecting a respective target gamut comprises:
   selecting an individual engine gamut as the target gamut for a respective object, if the respective object is identified as a normal text or line object.

3. The method of claim 1 further comprising at least one of:
   associating a tag indicating the respective selected target gamut with at least one pixel of each respective object; and
   mapping a respective gamut of each respective object according to the respective selected target gamut.

4. A method for preparing to produce a multi-page document in a multi-engine system, the method comprising:
   identifying objects within the document;
   identifying, by at least one component of the multi-engine system, characteristics of the identified objects, wherein identifying characteristics of the identified objects comprises identifying respective objects to be one of a graphic object, a pictorial object, a normal text or line object and a large text or line object; and
   selecting a respective target gamut for processing each respective identified object based upon at least the respective identified characteristics of the respective identified object, wherein selecting a respective target gamut comprises:

determining, for each identified large text or line object, pictorial object and/or graphic object, a similarity to other identified large text or line objects, pictorial objects and/or graphic objects in the document, thereby associating large text or line objects, pictorial objects and/or graphic objects in the document with groups of similar large text or line objects, pictorial objects and/or graphic objects;

selecting an intersection of a respective plurality of gamuts, associated with the plurality of engines as a respective target gamut for respective groups of similar large text or line objects, pictorial objects and/or graphic objects having a group characteristic that meets a selected criteria; and selecting a blended combination of a gamut of a selected individual engine and an intersection of a respective plurality of gamuts associated with the plurality of engines as a respective target gamut for a respective group of similar large text or line objects, pictorial objects and/or graphic objects having a group characteristic that does not meet the selected criteria, wherein selecting the intersection of the respective plurality of gamuts, associated with the plurality of engines as the respective target gamut for respective groups of similar large text or line objects, pictorial objects and/or graphic objects having a group characteristic that meets the selected criteria comprises:

selecting mapping to an intersection of a respective plurality of gamuts, associated with the plurality of engines, for respective groups of similar large text or line objects, pictorial objects and/or graphic objects having a group characteristic that meets the selected criteria in regard to at least one of a respective number of objects and sub-objects in the respective groups, a respective page-wise density of the objects and sub-objects in the respective groups throughout the document or a portion thereof, a respective size of the objects and sub-objects in the respective groups and a respective value of a respective function of one or more of the number, page-wise density and/or size.

5. The method of claim 4 wherein selecting a respective target gamut comprises:

selecting an individual engine gamut as the target gamut for a respective object, if the respective object is identified as a normal text or line object, 6. The method of claim 4 further comprising at least one of:

associating a tag indicating the respective selected target gamut with at least one pixel of each respective object; and mapping a respective gamut of each respective object according to the respective selected target gamut.

7. A method for preparing to produce a multi-page document in a multi-engine system, the method comprising:

identifying objects within the document;

identifying by at least one component of the multi-engine system, characteristics of the identified objects, wherein identifying characteristics of the identified objects comprises identifying respective objects to be one of a graphic object, a pictorial object, a normal text or line object and a large text or line object; and selecting a respective target gamut for processing each respective identified object based upon at least the respective identified characteristics of the respective identified object, wherein selecting a respective target gamut comprises:

determining, for each identified large text or line object, pictorial object and/or graphic object, a similarity to other identified large text or line objects, pictorial objects and/or graphic objects in the document, thereby associating large text or line objects, pictorial objects and/or graphic objects in the document with groups of similar large text or line objects, pictorial objects and/or graphic objects;

selecting an intersection of a respective plurality of gamuts, associated with the plurality of engines as a respective target gamut for respective groups of similar large text or line objects, pictorial objects and/or graphic objects having a group characteristic that meets a selected criteria, and selecting a blended combination of a gamut of a selected individual engine and an intersection of a respective plurality of gamuts associated with the plurality of engines as a respective target gamut for a respective group of similar large text or line objects, pictorial objects and/or graphic objects having a group characteristic that does not meet the selected criteria, wherein determining, for each identified large text or line object, pictorial object and/or graphic object, a similarity to other identified large text or line objects, pictorial objects and/or graphic objects in the document comprises:

identifying separate large text or line objects, pictorial objects, and graphic objects and sub-objects;

analyzing the identified large text or line objects, pictorial objects, and graphic objects and subobjects through a use of histograms; and clustering, as similar, those large text or line objects, pictorial objects, and graphic objects and sub-objects that are associated with a same or similar histogram.

8. The method of claim 7 wherein selecting a respective target gamut comprises:

selecting an individual engine gamut as the target gamut for a respective object, if the respective object is identified as a normal text or line object.

9. The method of claim 7 further comprising at least one of:

associating a tag indicating the respective selected target gamut with at least one pixel of each respective object; and mapping a respective gamut of each respective object according to the respective selected target gamut.

10. A method for preparing to produce a multi-page document in a multi-engine system, the method comprising:

identifying respective objects within the document to have respective characteristics of being one of: a graphic object, a pictorial object, a normal text or line object and a large text or line object; and selecting, by at least one component of the multi-engine system, a respective target gamut for processing each respective identified object based upon at least the respective identified characteristic of the respective identified object, the selected respective target gamut being one of: a gamut of a selected individual engine, an intersection of a respective plurality of gamuts associated with the plurality of engines and a blended combination of a gamut of a selected individual engine and an intersection of a respective plurality of gamuts associated with the plurality of engines, the selecting being based upon at least the respective identified characteristics of the respective identified object, wherein selecting a respective target gamut comprises:

determining, for each identified large text or line object, pictorial object and/or graphic object, a similarity to other identified large text or line objects, pictorial objects and/or graphic objects in the document, thereby associating large text or line objects, pictorial objects and/or graphic objects in the document with groups of similar large text or line objects, pictorial objects and/or graphic objects;

selecting an intersection of a respective plurality of gamuts as the respective target gamut for respective groups of similar large text or line objects, pictorial objects and/or graphic objects having a group characteristic that meets a selected criteria; and selecting a blended combination of a gamut of a selected individual engine and an intersection of a respective plurality of gamuts associated with the plurality of engines as a respective target gamut for a respective group of similar large text or line objects, pictorial objects and/or graphic objects having a group characteristic that does not meet the selected criteria, wherein determining, for each identified large text or line object, pictorial object and/or graphic object, a similarity to other identified large text or line objects, pictorial objects and/or graphic objects in the document comprises at least one of:

identifying clusters of large text or line objects and/or graphic objects and sub-objects that have a same or nearly a same uniform color; and identifying clusters of large text or line objects, pictorial objects and/or graphic objects and sub-objects that have the same or nearly the same combination or collection of colors.

11. The method of claim 10 further comprising at least one of:

associating a tag indicating the respective selected target gamut with at least one pixel of each respective object; and mapping a respective gamut of each respective object according to the respective selected target gamut.

12. The method of claim 10 wherein selecting a respective target gamut comprises:

selecting an individual engine gamut for the object, if the object is identified as a normal text or line object.

13. A method for preparing to produce a multi-page document in a multi-engine system, the method comprising:

identifying respective objects within the document to have respective characteristics of being one of: a graphic object, a pictorial object, a normal text or line object and a large text or line object; and selecting, by at least one component of the multi-engine system, a respective target gamut for processing each respective identified object based upon at least the respective identified characteristic of the respective identified object, the selected respective target gamut being one of: a gamut of a selected individual engine, an intersection of a respective plurality of gamuts associated with the plurality of engines and a blended combination of a gamut of a selected individual engine and an intersection of a respective plurality of gamuts associated with the plurality of engines, the selecting being based upon at least the respective identified characteristics of the respective identified object, wherein selecting a respective target gamut comprises:

determining, for each identified large text or line object, pictorial object and/or graphic object, a similarity to other identified large text or line objects, pictorial objects and/or graphic objects in the document, thereby associating large text or line objects, pictorial objects and/or graphic objects in the document with groups of similar large text or line objects, pictorial objects and/or graphic objects;

selecting an intersection of a respective plurality of gamuts as the respective target gamut for respective groups of similar large text or line objects, pictorial objects and/or graphic objects having a group characteristic that meets a selected criteria; and selecting a blended combination of a gamut of a selected individual engine and an intersection of a respective plurality of gamuts associated with the plurality of engines as a respective target gamut for a respective group of similar large text or line objects, pictorial objects and/or graphic objects having a group characteristic that does not meet the selected criteria, wherein selecting the intersection of a respective plurality of gamuts, associated with the plurality of engines, as the respective target gamut for respective groups of similar large text or line objects, pictorial objects and/or graphic objects having a group characteristic that meets the selected criteria comprises:

selecting the intersection of the respective plurality of gamuts, associated with the plurality of engines, for respective groups of similar large text or line objects, pictorial objects and/or graphic objects having a group characteristic that meets the selected criteria in regard to at least one of: a respective number of the objects and sub-objects in the respective groups, a respective page-wise density of the objects and sub-objects in the respective groups throughout the document or a portion thereof, a respective size of the objects and sub-objects in the respective groups and a respective value of a respective function of one or more of the number, page-wise density and/or size.

14. The method of claim 13 further comprising at least one of:

associating a tag indicating the respective selected target gamut with at least one pixel of each respective object; and mapping a respective gamut of each respective object according to the respective selected target gamut.

15. The method of claim 13 wherein selecting a respective target gamut comprises:

selecting an individual engine gamut for the object, if the object is identified as a normal text or line object.

16. A method for preparing to produce a multi-page document in a multi-engine system, the method comprising:

identifying respective objects within the document to have respective characteristics of being one of: a graphic object, a pictorial object, a normal text or line object and a large text or line object; and selecting, by at least one component of the multi-engine system, a respective target gamut for processing each respective identified object based upon at least the respective identified characteristic of the respective identified object, the selected respective target gamut being one of: a gamut of a selected individual engine, an intersection of a respective plurality of gamuts associated with the plurality of engines and a blended combination of a gamut of a selected individual engine and an intersection of a respective plurality of gamuts associated with the plurality of engines, the selecting being based upon at least the respective identified characteristics of the respective identified object, wherein selecting a respective target gamut comprises:

determining, for each identified large text or line object, pictorial object and/or graphic object, a similarity to other identified large text or line objects, pictorial objects and/or graphic objects in the document, thereby associating large text or line objects, pictorial objects and/or graphic objects in the document with groups of similar large text or line objects, pictorial objects and/or graphic objects;

selecting an intersection of a respective plurality of gamuts as the respective target gamut for respective groups of similar large text or line objects, pictorial objects and/or graphic objects having a group characteristic that meets a selected criteria; and selecting a blended combination of a gamut of a selected individual engine and an intersection of a respective plurality of gamuts associated with the plurality of engines as a respective target gamut for a respective group of similar large text or line objects, pictorial objects and/or graphic objects having a group characteristic that does not meet the selected criteria, wherein determining, for each identified large text or line object, pictorial object and/or graphic object, a similarity to other identified large text or line objects, pictorial objects and/or graphic objects in the document comprises:

identifying separate large text or line objects, pictorial objects, and graphic objects and sub-objects;

analyzing the identified large text or line objects, pictorial objects, and graphic objects and sub-objects through a use of histograms;

clustering, as similar, those large text or line objects, pictorial objects, and graphic objects and sub-objects that are associated with a same or similar histogram.

17. The method of claim 16 further comprising at least one of:

associating a tag indicating the respective selected target gamut with at least one pixel of each respective object; and mapping a respective gamut of each respective object according to the respective selected target gamut.

18. The method of claim 16 wherein selecting a respective target gamut comprises:

selecting an individual engine gamut for the object, if the object is identified as a normal text or line object.

19. A document processing system comprising:

an object identifier that is operative to identify image objects within the document;

a characteristic identifier that is operative to identify characteristics of the identified objects, wherein the characteristic identifier is operative to identify a respective object to be one of a graphic object, a pictorial object, a normal text or line object and a large text or line object; and a gamut selector that is operative to select a respective target gamut for processing each respective identified object based upon at least the respective identified characteristics of the respective identified object wherein the gamut selector is operative to select a respective target gamut by determining, for each identified large text or line object, pictorial object and/or graphic object, a similarity to other identified large text or line object, pictorial object and/or graphic objects in the document, thereby associating large text or line objects, pictorial objects and/or graphic objects in the document with groups of similar large text or line objects, pictorial objects and/or graphic objects, selecting an intersection of a respective plurality of gamuts, associated with the plurality of engines, as the respective target gamut for respective groups of similar large text or line objects, pictorial objects and/or graphic objects having a group characteristic that meets the selected criteria and selecting at least one individual engine gamut of at least one selected engine as the at least one respective target gamut for respective groups of similar large text or line objects, pictorial objects and/or graphic objects having a group characteristic that does not meet the selected criteria and wherein the gamut selector is operative to determine the similarity, for each identified large text or line object, pictorial object and/or graphic object, a similarity to other identified large text or line objects, pictorial objects and/or graphic objects by at least one of identifying clusters of large text or line objects, pictorial objects and/or graphic objects and sub-objects that have a same or nearly a same uniform color and identifying clusters of large text or line objects, pictorial objects and/or graphic objects and sub-objects that have a same or nearly a same combination or collection of colors.

20. The system of claim 19 wherein the gamut selector is operative to select an individual engine target gamut for the object, if the object is identified as a normal text or line object.

21. A document processing system comprising:

an object identifier that is operative to identify image objects within the document a characteristic identifier that is operative to identify characteristics of the identified objects, wherein the characteristic identifier is operative to identify a respective object to be one of a graphic object, a pictorial object, a normal text or line object and a large text or line object; and a gamut selector that is operative to select a respective target gamut for processing each respective identified object based upon at least the respective identified characteristics of the respective identified object wherein the gamut selector is operative to select a respective target gamut by determining, for each identified large text or line object, pictorial object and/or graphic object, a similarity to other identified large text or line object, pictorial object and/or graphic objects in the document, thereby associating large text or line objects, pictorial objects and/or graphic objects in the document with groups of similar large text or line objects, pictorial objects and/or graphic objects, selecting an intersection of a respective plurality of gamuts, associated with the plurality of engines, as the respective target gamut for respective groups of similar large text or line objects, pictorial objects and/or graphic objects having a group characteristic that meets the selected criteria and selecting at least one individual engine gamut of at least one selected engine as the at least one respective target gamut for respective groups of similar large text or line objects, pictorial objects and/or graphic objects having a group characteristic that does not meet the selected criteria and wherein the gamut selector is operative to select an intersection of a respective plurality of gamuts, associated with the plurality of engines, as the respective target gamut for respective groups of similar large text or line objects, pictorial objects and/or graphic objects having a group characteristic that meets the selected criteria in regard to at least one of a respective number of the large text or line objects, pictorial objects and/or graphic objects and sub-objects in the respective groups, a respective page-wise density of the large text or line objects, pictorial objects and/or graphic objects and sub-objects in the respective groups throughout the document or a portion thereof, a respective size of the large text or line objects, pictorial objects and/or graphic objects and sub-objects in the respective groups and a respective value of a respective function of one or more of the number, page-wise density and/or size.

22. A document processing system comprising:

an object identifier that is operative to identify image objects within the document;

a characteristic identifier that is operative to identify characteristics of the identified objects, wherein the characteristic identifier is operative to identify a respective object to be one of a graphic object, a pictorial object, a normal text or line object and a large text or line object; and a gamut selector that is operative to select a respective target gamut for processing each respective identified object based upon at least the respective identified characteristics of the respective identified object wherein the gamut selector is operative to select a respective target gamut by determining, for each identified large text or line object, pictorial object and/or graphic object, a similarity to other identified large text or line object, pictorial object and/or graphic objects in the document, thereby associating large text or line objects, pictorial objects and/or graphic objects in the document with groups of similar large text or line objects, pictorial objects and/or graphic objects, selecting an intersection of a respective plurality of gamuts, associated with the plurality of engines, as the respective target gamut for respective groups of similar large text or line objects, pictorial objects and/or graphic objects having a group characteristic that meets the selected criteria and selecting at least one individual engine gamut of at least one selected engine as the at least one respective target gamut for respective groups of similar large text or line objects, pictorial objects and/or graphic objects having a group characteristic that does not meet the selected criteria, wherein the gamut selector is operative to select an individual engine target gamut for the object, if the object is identified as a normal text or line object and wherein the gamut selector is operative to determine, for each identified large text or line objects, pictorial objects and/or graphic objects and sub-objects, a similarity to other identified large text or line objects, pictorial objects and/or graphic objects and sub-objects in the document by identifying separate large text or line objects, pictorial objects, and graphic objects and sub-objects, analyzing the identified large text or line objects, pictorial objects, and/or graphic objects and sub-objects through a use of histograms, and clustering as similar, those large text or line objects, pictorial objects, and graphic objects and sub-objects that are associated with a same or similar histogram.

* * * * *